March 17, 1964     J. F. BRUMBACH     3,125,638
PAPER FEED MEANS
Filed Oct. 30, 1961
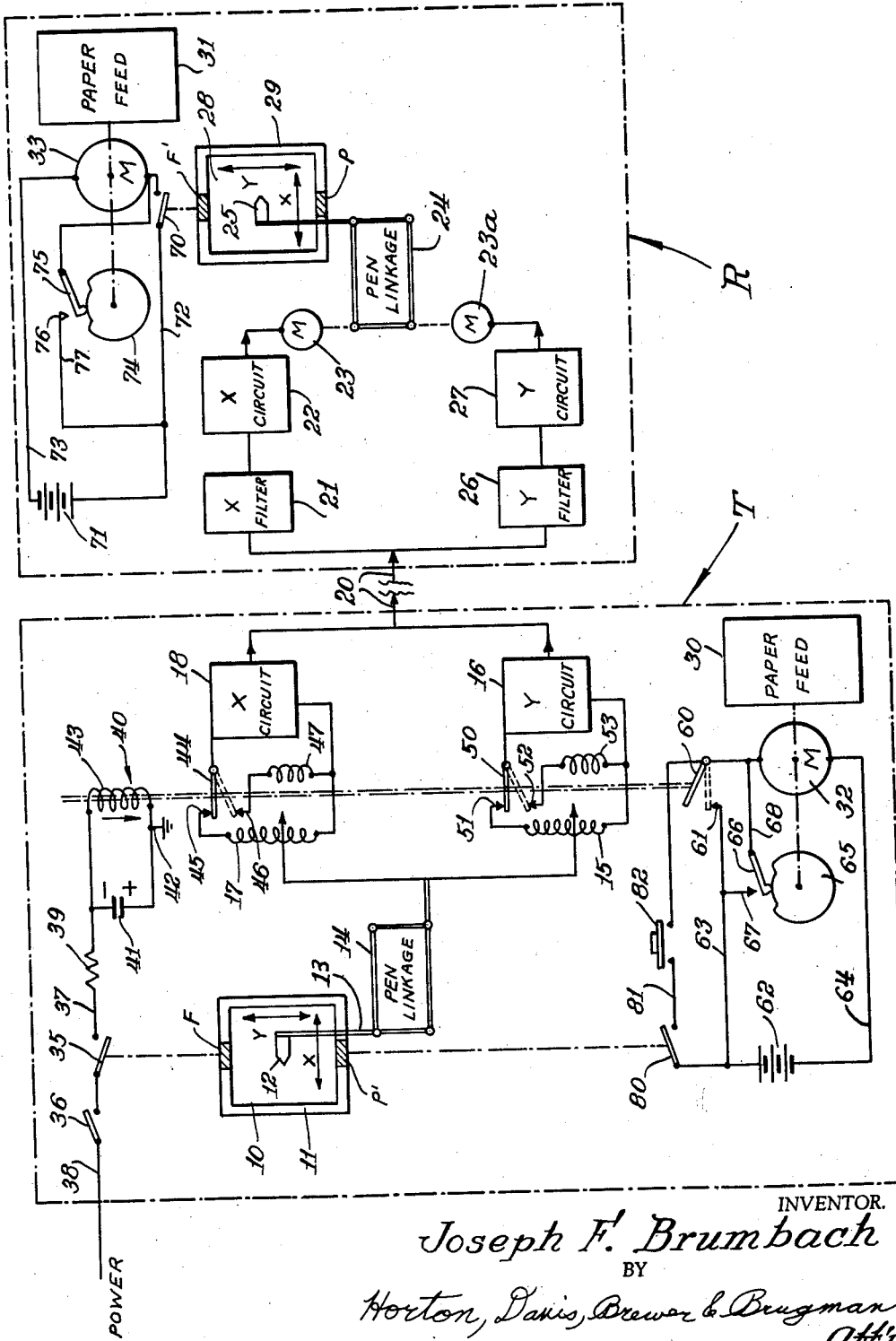
INVENTOR.
Joseph F. Brumbach
BY
Horton, Davis, Brewer & Brugman
Att'ys.

United States Patent Office 3,125,638
Patented Mar. 17, 1964

3,125,638
PAPER FEED MEANS
Joseph F. Brumbach, Niles, Ill., assignor to Victor Comptometer Corporation, Chicago, Ill., a corporation of Illinois
Filed Oct. 30, 1961, Ser. No. 148,368
8 Claims. (Cl. 178—18)

This invention relates generally to graphic communication systems, and more particularly, to improve means for replacing an expendable recording medium at remote transmitting and receiving stations thereof.

Communication systems wherein intelligence is graphically recorded simultaneously with its transmission and graphically reproduced at a remote receiving station are well known. One of the more recent innovations in this field provides apparatus wherein the intelligence is recorded in the form of a handwritten message transcribed by a stylus or recording pen manipulated over a work-area or surface of a suitable recording medium such as paper. The coordinate handwriting movements of the pen or stylus are suitably harnessed to generate electrical coordinate data signals which are transmitted to and received by a remotely positioned receiving station whereat a servo system or other conventional follow-up means is energized to drive a receiving stylus over an adjacent recording medium to reproduce the handwritten intelligence or message thereon. In such a system, it is essential that the recording paper or medium, at both the transmitting and receiving stations, be periodically replaced so that successive messages will appear on separated areas thereof. This is conventionally accomplished by utilizing a recording medium comprising an elongated paper web trained over suitable rollers associated with a motorized feed mechanism so that replacement of the recording medium may be effected by periodically advancing a fresh area of the paper web to a designated recording area accessible to the stylus or pen. Preferably, the paper replacement operation is initiated by energizing the motorized paper feed system at the transmitter and receiving stations in response to a predetermined paper feed signal, usually originated by the transmitting operator. The paper feed signal then effects simultaneous advancement of the paper web at both the transmitting and receiving stations.

In a typical tele-autographic system of the order in which the present invention is useful, the paper feed signal may be initiated conveniently by moving the stylus at the transmitter station to a preselected position or feed signal generating area, preferably adjacent to, but beyond the normal recording area confronted thereby. When so positioned, the transmitting stylus initiates a paper feed cycle of a predetermined duration at the transmitting station, usually by physically closing a micro-switch which controls an electrical circuit to the motorized paper feed means. Simultaneously, the coordinate data signals corresponding to the transmitting stylus position are transmitted to the receiver to drive the receiving station stylus into a corresponding position for initiating a paper feed cycle at the receiving station.

While various means for accomplishing the requisite paper feed and replacement operation at remote stations in accordance with the above briefly outlined system generally are known, as, for example, from the teachings of U.S. Patent No. 2,621,249, issued December 9, 1952, certain deficiencies and difficulties have been encountered in practicing the prior art teachings which have led to the improved advancements of the present invention.

One of the principal difficulties encountered in such previous known systems centers about the inability of the operator to be sure a paper feed operation at the receiver has occurred even though paper feed at the transmitter has taken place. For example, if there is a minor error in calibration of the stylus moving means at the transmitting and receiving machines, placing the transmitter stylus barely within its paper feed signal initiating zone may not result in the follow-up positioning of the receiver's stylus required for initiating a paper feed operation at the receiver. This is particularly so if a sensitive switch is physically actuated by the stylus for energizing the paper feed means. Additionally, if the transmitter stylus is not held in its paper feed initiating position for a sufficient length of time, the requisite pen position data signals may not persist long enough to produce follow-up movement of the receiver stylus to its paper feed position, even though paper feed at the transmitter takes place. As a consequence, the operator at the transmitting station, prior to the present invention, could not be certain that a desired paper feed cycle would occur or had occurred at the remote receiving station, even though such operation were accomplished at the transmitting station, within the operator's view and control. Experience has also proven that the motorized feed means at the transmitting and remote receiving stations do not always operate at the same speed. Under such conditions, positively holding the transmitter stylus in a paper feed initiation position so as to insure the reception of sufficient signal at the remote receiver to place the stylus at that station in position for initiating paper feed, may result in overfeeding at the remote receiving station if the motorized feed system thereat operates at a greater speed than the feed system at the transmitting station. Conversely, if the receiver's feed system is slower than the transmitter's, an incomplete paper feed cycle may follow at the remote receiving station, even though a paper feed cycle is complete at the transmitting station. Thus, by previous practice, the operator initiating paper feed had no assurance of its proper accomplishment at remote stations.

It is the main object of this invention to provide a new and improved means for initiating and controlling the replacement of expendible recording medium at remote transmitting and receiving stations of a graphic communication system.

Another important object of this invention is to provide a new and improved paper feed means for graphic communication systems wherein a stylus position is utilized to initiate paper feed cycles at remote transmitting and receiving stations and in which control of the paper feed cycle, after initiation by the stylus positioning, is transferred to a relay operated control means capable of properly initiating paper feed positioning of a remote receiver stylus independently of the subsequent movement of the stylus at the transmitting station.

Still another object of this invention is to provide a new and improved paper feed means as aforesaid, wherein time delay means are embodied in the control circuitry at the transmitting station so as to insure initiation and completion of a paper feed cycle at a remote receiving station, whenever the paper feed cycle at the transmitting station is initiated.

The above and further objects, features and advantages of this invention will appear to those skilled in the art from the following description of a preferred embodiment thereof illustrated in the accompanying drawings.

In the drawings, the single figure is a circuit diagram with various operating sections indicated in block form, for a tele-autographic communication system, including paper feed control means according to this invention.

A tele-autographic system, while schematically represented in the single figure of the drawings, will not be described in detail herein, since it may comprise any of several known devices, as, for example, the apparatus and system taught in United States Patent No. 2,583,720, dated January 29, 1952, entitled "Follow-Up Apparatus and System." Generally speaking, however, such a tele-autographic system includes a transmitting station T and a receiving station R as indicated in the drawings. In practice, these stations often constitute transceivers, as will be described briefly hereinafter. For initial consideration, however, the station T may be considered from the standpoint of its transmitting function and the station R from its receiving function.

As schematically illustrated in the drawings, the transmitting station includes a writing surface 10 suitably supported and bounded by a frame 11 definitive of a normal operating area to which paper or a similar recording medium is periodically advanced for the transcribing of messages thereon by a manually operated and directed stylus or pen 12.

Stylus 12 is mechanically coupled by link or arm 13 to a parallel linking system 14 by which physical signals corresponding to coordinate movements of the stylus 12 along designated X and Y axes are transmitted to suitable electrical apparatus adapted ot generate and transmit position data signals corresponding to the physical positioning of the stylus 12; such data signals being received by station R. For amplification of such a transmitting and receiving apparatus, reference may be had to the above-referred to U.S. Patent No. 2,583,720.

Basically, the physical positioning of the stylus 12 is determined by X and Y coordinates definitive of the total writing area 10; with the particular position of the stylus 12 at any moment within the boundaries of area 10 defining a point of intersection for X and Y coordinates determinative of signals having preselected different frequencies generated by respective X and Y circuits of the transmitter. It will be appreciated, for example, that movement of the stylus 12 along the indicated Y axis results in a corresponding variation for movement of the linkage system 14 to correspondingly change or vary the reactance of a circuit inductance 15 associated with the indicated Y circuit 16. While in the illustrated circuitry of the drawings, the inductance 15 is illustrated as wholly variable, the same may comprise a combination fixed and variable inductance. In any event, the movement of the stylus along the Y axis serves to vary the reactance of the indicated inductance 15 to change the resonant frequency of the Y circuit to produce a corresponding variation in the output signal frequency of the Y circuit. In a similar manner, movement of the stylus 12 along the X axis produces a corresponding shifting movement of the linkage system 14 and resultant variation of the reactance of a second variable inductance 17 associated with the X circuit 18, thereby altering the resonant frequency of the X circuit to produce a corresponding variation in its output signal frequency.

The output signals for both the X and Y circuits are passed over a common transmission line 20 to the receiver station R whereat the X signal is passed through an X filter 21 to a discriminating and amplifying X circuit 22. Circuit 22 feeds X position motor 23 coupled to parallel linkage system 24 corresponding to the pen linkage system 14 of the transmitter. Thus, the receiver stylus 25 is moved to an ultimate position along the indicated X axis as dictated by the received X data signal.

In a similar manner, the Y signal output of the transmitter's Y circuit 16 is fed to a Y filter 26 of the receiver, and thence to a Y discriminating and amplifying circuit 27 which produces an output signal for driving a Y position motor 23a also coupled to the pen linkage system 24. Ultimately, therefore, the receiver stylus 25 is moved along the Y axis to a position determined by the received Y data signal.

It will be understood that the X and Y signals from the transmitter are of markedly different frequencies so that they may be passed over the same transmission line 20 to the receiver station R, whereat the X signals are effectively blocked by the Y filter and the Y signals are blocked by the X filter. Thus the X signals pass only through the X filter 21 and the Y signals correspondingly pass through only the Y filter 26 to produce coordinate movements of the receiver stylus 25 along the X and Y axes or coordinates, as above indicated.

As illustrated, the receiver stylus 25, like the transmitter stylus 12, is movable over a designated writing area 28 bounded by a suitable frame 29 associated with the receiving apparatus. It will thus be seen that as the transmitting stylus 12 is moved over its associated writing surface 10, the receiver stylus 25 is correspondingly moved along a similar path over its associated writing surface 28. In this manner, handwriting or other data transcribed by the transmitter stylus on surface 10 is duplicated at the receiver.

Having thus set forth the generalities and principles of operation for a typical tele-autographic communication system (which is more fully described and amplified in the aforementioned U.S. Patent No. 2,583,720) the improved features of the present invention for effecting replacement of the recording medium at the writing areas 10 and 28 at the transmitter and receiver, respectively, will now be set forth.

As previously mentioned, after completing the transmission of a desired message, as effected by the movements of the transmitter stylus 12 over the transmitter's writing area 10, thereby visually transcribing such message on the recording medium thereat, it is essential to replace the writing surfaces at both the recording areas 10 and 28 of the transmitter and receiver so that successive messages will not overlap or interfere with one another. Conventionally, the writing surface at the transmitter and receiver is provided by an elongated recording medium, such as a web of paper, so that the needed replacement operation may be conveniently brought about by shifting or advancing the paper web to present a new or blank writing surface to the transcribing areas 10 and 28 confronted by the stylus pens 12 and 25 respectively. To effect such paper replacement cycle or operation, it is necessary to energize suitable paper feed apparatus or means at both the transmitting and receiving stations, such paper feed means being indicated schematically at 30 and 31 in the transmitter and receiver stations of the drawings respectively. While the particulars of the paper feed means will not be described in detail herein, it will be readily understood that such may comprise any suitable system for rotatably driving paper web supporting rollers, such as a chain and sprocket drive system or other known apparatus adapted to be driven by suitable drive motor means, such as drive motor 32 at the transmitter and motor 33 at the receiver. The particular means disclosed herein for selectively activating and controlling such drive motor means, however, constitutes the heart of the present invention, as will now be described.

For purposes of the present disclosure, the particular control means of this invention is illustrated only in association with the transmitter; it being understood that if the receiver is equipped as a transceiver, the same will also include a control means of the order about to be described.

In accordance with the previously discussed premise that it is desirable for convenience of operation to initiate the paper feed signal by movement of the stylus or pen to a designated feed signal initiating area, movement of the transmitter stylus 12 into the area labelled F, immediately adjacent to the normal writing area 10 confronted thereby, is utilized to initiate a desired paper feed and replacement cycle, immediately at the transmitter and ultimately at the receiver. When the transmitter stylus 12 is so positioned in the feed signal initiating area F, the stylus 25 of the receiver correspondingly is moved by the coordinate X-Y data signals transmitted to the receiver to approach its corresponding paper feed signal initiating area F'. As discussed previously, initiating the paper feed signal in this manner is known in the art, and so long as conditions are ideal, successful replacement of the expendable recording medium or paper at the two stations may be carried out thereby. However, if the speeds of the two feed motors 32 and 33 are not alike, or if the operator at the transmitting station removes the transmitting stylus 12 from its feed signal area F before the receiving stylus 25 reaches its feed signal initiating zone F', improper feeding at the remote receiver may be experienced even though a satisfactory paper feed cycle is accomplished at the transmitter. Additionally, if for any reason the X or Y coordinate data signals for the F position of the transmitter stylus 12 are weak or interfered with, responsive movement of the receiver stylus 25 into its area F' may not occur.

To alleviate these defects, the present invention embodies improved control means whereby movement of the transmitter stylus 12 to area F serves to physically close a micro-switch 35 as indicated by the schematic link line between area F and switch 35. Switch 35 is in series circuit with a manually operated circuit conditioning switch 36 coupled by conductor 37 to an electrical supply source 38, which may comprise, as illustrated, a D.C. supply in the order of −45 volts. It will be recognized, therefore, the preconditioning of the feed control circuitry by manually closing switch 36 is required before the paper feed cycle may be initiated by closing the stylus operated micro-switch 35. Conductor 37 couples the D.C. supply over a resistor 39 (in the order of 220 ohms) to a three pole double throw relay 40 in parallel circuit with a capacitor 41; the relay circuit being returned to ground, as indicated at 42.

Relay 40 is a fast-make, slow-break type with the capacitor 41 having a value in the order of 20 mfd. to provide a substantially 80 millisecond delay in the switch opening operation of the relay 40 as effected by de-energization of its operating coil 43. By this feature, at least an 80 millisecond delay in releasing the relay from its operating condition is assured, even though the micro-switch 35 be opened by removal of the pen or stylus 12 from its signal initiating position F.

Energization of the relay 40 serves to throw a first contact arm 44 from its normal first position, wherein it engages contact 45, to a second position wherein it engages contact 46. When engaged in its first operating condition with contact 45, arm 44 permits energization of the X signal circuit of the transmitter over a variable inductance 17; the reactance of which is determined by the X coordinate position of the stylus 12. When contact arm 44 is operated by relay 40 to close circuit with contact 46, however, the variable inductance 17 is effectively shunted out of the X or horizontal circuit for the transmitter, and replaced with a substitute fixed inductance 47, which serves to provide a frequency shifted signal to more positively drive the receiver stylus 25 into its feed signal initiating area F'. In this respect, capacitors may alternatively be substituted for the inductances 47 and 17. In any event, the X signal output of the transmitter's X circuit, under the influence of the substituted circuit inductance 47, produces a frequency shifted X coordinate signal corresponding to the F and F' area positions independently of the X coordinate data signal indicated by the actual position of the transmitter stylus 12.

In a similar manner, relay 40 serves to throw a second contact arm 50 away from contact 51 to engage contact 52, thereby substituting a fixed inductance 53 for the variable inductance 15 in the Y or vertical signal circuit 16 of the transmitter, which, in turn, serves to positively drive the receiver stylus 25 into its paper feed initiating position or area F', independently of the actual physical positioning of the transmitter stylus 12.

Thus, it will be recognized that once relay 40 is energized, the substitute X and Y position signals, produced by substituting the inductances 47 and 53, in the X and Y transmitter circuits respectively, take over to positively drive the receiver stylus 25 to its paper feed signal initiating area F'. Further such substitute X and Y position signals are maintained for at least 80 milliseconds, as provided by the time delay furnished by capacitor 41 in parallel circuit associated with the relay operating coil 43. Thus the deficiency experienced in prior art devices for this purpose, wherein the transmitting operator failed to maintain the transmitter stylus 12 in its signal initiating area F for a sufficient period of time to initiate paper feed at the receiver, is successfully avoided by the above-described feature.

In addition to contact arms 44 and 50, relay 40 also operates a third contact arm 60. When arm 60 is thrown into engagement with contact 61, energization of the transmitter's paper feed motor 32 takes place over a suitable motor circuit including supply source 62, herein shown as a battery, and conductors 63 and 64.

Upon energization of the paper feed motor 32, the paper feed apparatus 30 is placed in operation to commence the feeding or advancement of the paper web to area 10 at the transmitting station. As shown, a cam member 65 is rotatably driven by motor 32 to close a cam follower contact arm 66 with contact 67 thereby to energize the motor 32 over a secondary circuit comprising conductor 68 arranged in parallel with conductor 63 and the relay operated arm 60 and contact 61. With this arrangement, even momentary energization of relay 40, coupled with the time delay for its de-energization as provided by capacitor 41, assures continued energization of paper feed motor 32 over its alternate supply circuit. Circuit closing operation of the cam operated switch arm 66 assures completion of a full paper feed cycle at the transmitter, with the duration of such feed cycle being determined by the time interval switch arm 66 is held closed with contact 67, dictated by the rotation of cam 65.

From the immediately preceding description, it will be seen how the present invention assures paper feed at the transmitter once the relay 40 has been energized. More importantly, it will be recognized that paper feeding at the transmitting station cannot take place unless the relay 40 is, in fact, energized. Thus, stylus 12 must, by the present teaching, be positioned in area F sufficiently to energize relay 40 before paper feeding at the transmitter is possible.

It will be recalled that energization of relay 40 promotes the substitute X-Y signals for positively driving the receiver stylus 35 into its paper feed initiating position F'. When this occurs, receiver stylus 25 physically closes a micro-switch 70 in the supply circuit for the paper feed motor 33 of the receiver; motor 33 being energized from a suitable source of electrical energy, such as battery 71, over conductor 72 and return conductor 73. As in the described arrangement for the paper feed apparatus of the transmitter, the receiver's paper feed motor 33 rotatably drives a cam member 74 which operates follower switch arm 75 to engage contact 76 and thereby provide an alternate motor energizing circuit over parallel conductor 77 coupled to the electrical supply. With this arrangement, once the paper feed motor 33 is energized for a period of time sufficient to close circuit through the cam operated switch arm 75 and contact 76, removal of the receiver stylus 25 from its paper feed initiating position F' will not disrupt the paper feed cycle at the receiver. To that end, the described time delay means built into the relay system associated with the transmitter insures that the alternate or substitute X-Y signals will be transmitted for a sufficient period to insure the required closure of the cam operated switch arm 75 with contact 76.

In addition to the simple transmitter-receiver relationship described hereinabove, it will be recalled that each of the stations may, in fact, comprise a transceiver. In that event, the receiver R will be equipped with a feed control circuit and relay system of the order above described in relation to the transmitter T. Under such conditions, if the paper feed replacement cycle is to be initiated at the receiver R, the transmitter T is equipped with an alternate motor control circuit which includes a pen responsive or operated micro-switch 80, a conductor 81, in parallel circuit relationship with the primary motor circuit conductors 63 and 64, and a manually operable conditioning switch 82 which is closed to place the transmitter in a mode for receptive response to paper feed initiation at the receiver. The relay circuit conditioning switch 36 is also placed in an open position for this operation to avoid operation of a relay 40 at the transmitter and the interfering transmission of the alternate X-Y control signals from the transmitter plus the attendant energization of the feed motor 32 as above related. In any event, with switch 36 open, and the conditioning switch 82 closed, movement of the receiver stylus 25 to its paper feed initiating position, which is illustrated in the drawings for the sake of convenience as alternate area P opposite area F′, produces responsive movement of the transmitter stylus 12 to a corresponding position P′ wherein it will close micro-switch 80 to cause paper feed at the transmitter. In this latter regard, it will be readily recognized and appreciated that the alternate areas P and P′ for the receiver R and transmitter T may in practice constitute the previously described paper feed initiating areas F′ and F respectively, the alternate areas P and P′ being designated herein for purposes of simplification. In any event, closing micro-switch 80 by the means of the transmitter stylus 12 serves to energize the transmitter's feed motor 32, with attendant operation of paper feed apparatus 30 and the resultant closure of the associated cam operated switch 66 with contact 67 to insure completion of a paper feed cycle at the transmitter, even though the transmitter stylus 12 is thereafter removed from its position for closing micro-switch 80.

Thus it will be seen that the present invention provides a new and improved means for positively assuring paper feed and replacement at remote transmitting and receiving stations of graphic communication systems, doing so with a unique time delay relay means which serves to shift initiating control of the paper feed cycle from a manually positioned stylus, such as the transmitter stylus 12, to an automatic control system. By this means improved assurance is given to the operator that initiation of a paper feed cycle at the transmitter, for example, will result in initiation and completion of a corresponding paper feed cycle at the remote receiving station, even though the operator should maintain the transmitter stylus in its paper feed initiating position only momentarily. Thus, underfeeding or misfeeding at the remote station, as experienced in previous control means for this purpose, is successfully avoided by the present invention. Likewise, overfeeding at the remote station is easily avoided by removing the initiating stylus from its feed signal position, once the feeding operation is commenced at the initiating station, all this being directly within the control of the initiating operator.

It will therefore be recognized that while the present invention has been described in its relation to a particular tele-autographic communication system and other apparatus as schematically represented in the drawings, numerous changes, modifications and substitutions of equivalents may therein without necessarily departing from the spirit and scope of this invention. Thus, while the present invention has been described and disclosed in conjunction with a particular embodiment thereof, it is not intended that the same be limited thereto, except as may appear in the following claims.

I claim:

1. In a graphic communication system of the type wherein the communicated intelligence is graphically recorded on the surface of a replaceable recording medium by movable stylus means at intelligence signal transmitting and remote receiving stations, an improved means for selectively effecting the replacement of the recording medium at each of said stations comprising, power operated means at each of said stations operable for replacing the recording medium thereat, means at each of the receiving stations for initiating operation of its associated said power operated means in response to reception of a preselected signal, circuit means at the transmitting station for producing said preselected signal for a predetermined minimum time interval, relay means at said transmitting station operable for controlling energization of said preselected signal producing circuit means and for initiating energization of the said power operated means at said transmitting station within said time interval of said preselected signal, means activated by the stylus means at said transmitting station for selectively effecting operation of said relay means, and means operated by each of said power operated means for maintaining the same energized for a preselected time interval once the initiating energization of said power operated means is effected.

2. The combination as set forth in claim 1 including time delay means associated with said relay means for producing a predetermined time delay in the de-energization of the latter whereby to insure energization of said power operated means at all stations for a period sufficient to effect energization thereof by the said means operated thereby.

3. The combination as set forth in claim 2 wherein said means operated by said power operated means comprises cam operated switch means controlling an alternate energizing circuit for said power operated means.

4. In a graphic communication system wherein intelligence is graphically transcribed by stylus means on a replaceable recording medium at a signal transmitting station and at a remote receiving station, improved means for selectively replacing the recording medium at each station comprising, power operated means at said transmitting and receiving stations for feeding the recording medium to a transcribing position thereat, means at said transmitting station for producing a predetermined recording medium replacement signal, means at said receiver station, operated in response to the reception of said replacement signal, for initiating feeding operation of its associated said power operated means, relay means at said transmitting station operable for effecting energization of said power operated means thereat and for operating said means for producing said replacement signal, and means at the transmitting station for selectively operating said relay means in response to the positioning of the stylus means thereat in a selected position.

5. The combination as set forth in claim 4 including time delay means associated with said relay means for locking the latter in an operating condition for a predetermined minimum time interval thereby to insure transmission of said replacement signal and the energization of the power operated means at both said stations for said minimum time interval, and means associated with and operated by said power operated means at each of said stations within said minimum time interval for maintaining said power operated means energized for a period of time sufficient to complete medium replacement at each station independently of the operating condition of said relay means.

6. In a tele-autographic communication system wherein stylus means at a transmitting station serve to transcribe message intelligence on the surface of a replaceable recording medium, the movements of said stylus means over a designated recording area serving to produce data signals corresponding to its graphic position, which signals are transmitted to a remote receiver station to correspondingly position a stylus means thereat so as to transcribe the transmitted intelligence within a designated area of a related recording medium at the receiver station, improved means for periodically replacing the recording medium at each of said stations comprising, motorized means at each station for advancing the associated recording medium to the designated recording area thereat, the said motorized means at the receiver station being energized by movement of the stylus means thereat to a predetermined position in which the same serves to close switch means controlling an energizing circuit for its associated motorized means, signal control circuit means at said transmitter station operable to produce predetermined data signals for driving the stylus means at the receiver station to its said predetermined position in substitution of the data signals produced by the graphic position of the stylus means at the transmitter station, electrical relay means at said transmitter station controlling operation of said signal control circuit means, additional switch means operated by said relay means for controlling energization of the said motorized means at the transmitter station, time delay means associated with said relay means for maintaining the said signal control circuit means and motorized means at said transmitter station in operating condition for a predetermined minimum time interval of substantial duration, and initiating switch means controlling an energizing circuit for said relay means and operable to effect energization of the latter in response to movement of the stylus means at said transmitter station to a predetermined graphic position whereby initiation of a medium replacement cycle at the transmitting station insures initiation of a medium replacement cycle at the remote receiver station and such initiation thereof insures completion of the replacement cycle independently of the position of said stylus means at the transmitter station subsequent to initiation of the replacement cycle thereby.

7. The combination as set forth in claim 6 including cam operated switch means operated by the motorized means at the transmitter and receiver stations, said cam operated switch means serving to control energization of the respective motorized means independently of the energization thereof as effected by said relay means, with such independent control of said motorized means being effected within the said minimum time interval afforded by the said time delay means.

8. In a graphic communiction system wherein intelligence is communicated between remote transmitting and receiving stations and is simultaneously recorded on an expendible recording medium by transcribing stylus means movable over a designated recording area at each station, improved means for periodically replacing the recording medium at each station by moving the stylus means thereat into a predetermined position comprising, power operated means at each station for advancing the recording medium to the recording area thereat, switch means at said receiving station for controlling energization of its associated power operated means and related means for replacing the recording medium in response to movement of the receiver stylus means to its predetermined position, signal generating means at said transmitter station for controlling movement of the stylus means at said receiving station according to the movements of the stylus means at the transmitter station, substitute control circuit means associated with said signal generating means for causing the latter to generate substitute signals independently of the positional movements of the stylus means at said transmitter station, said substitute signals causing the stylus means at the receiver station to move to its said predetermined position, time delay relay means selectively operable to energize said substitute circuit means for a minimum time interval, initiating switch means controlling energization of said relay means and operable in response to movement of the stylus means at the transmitter station to its predetermined position, additional switch means controlling operation of said power operated means at said transmitter station and operable in response to energization of said relay means, and means operable within said minimum time interval for maintaining the power operated means at each station in operation for a sufficient time to effect replacement of the recording medium at both of said stations once said relay means is energized.

References Cited in the file of this patent

UNITED STATES PATENTS 2,621,249    Ress                    Dec. 9, 1952

FOREIGN PATENTS 803,728    Great Britain           Oct. 29, 1958

UNITED STATES PATENT OFFICE
CERTIFICATE OF CORRECTION

Patent No. 3,125,638                      March 17, 1964

Joseph F. Brumbach

It is hereby certified that error appears in the above numbered patent requiring correction and that the said Letters Patent should read as corrected below.

Column 1, line 10, for "improve" read -- improved --; column 3, line 20, for "ot" read -- to --; column 6, line 45, for "35" read -- 25 --; column 7, line 60, after "may" insert -- be made --.

Signed and sealed this 14th day of July 1964.

(SEAL)

Attest:

ESTON G. JOHNSON                      EDWARD J. BRENNER
Attesting Officer                       Commissioner of Patents